US012368221B2

(12) United States Patent
Arai et al.

(10) Patent No.: US 12,368,221 B2
(45) Date of Patent: Jul. 22, 2025

(54) DIELECTRIC FILTER

(71) Applicant: Murata Manufacturing Co., Ltd., Nagaokakyo (JP)

(72) Inventors: Masashi Arai, Nagaokakyo (JP); Hitoshi Tada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 177 days.

(21) Appl. No.: 18/370,686

(22) Filed: Sep. 20, 2023

(65) Prior Publication Data

US 2024/0014534 A1 Jan. 11, 2024

Related U.S. Application Data

(63) Continuation of application No. PCT/JP2022/004292, filed on Feb. 3, 2022.

(30) Foreign Application Priority Data

Mar. 29, 2021 (JP) ................................ 2021-055344

(51) Int. Cl.
*H01P 1/205* (2006.01)
*H01P 1/20* (2006.01)
*H01P 3/16* (2006.01)

(52) U.S. Cl.
CPC .......... *H01P 1/2002* (2013.01); *H01P 1/2053* (2013.01); *H01P 3/16* (2013.01)

(58) Field of Classification Search
CPC ........ H01P 1/2002; H01P 1/202; H01P 1/205; H01P 1/2053; H01P 1/2056; H01P 1/20;
(Continued)

(56) References Cited

U.S. PATENT DOCUMENTS 6,556,101 B1 4/2003 Tada et al.
11,862,835 B2 * 1/2024 Chou ........................ H01P 3/16
(Continued)

FOREIGN PATENT DOCUMENTS

JP 2001-196817 A 7/2001
JP 2001-237619 A 8/2001
(Continued)

OTHER PUBLICATIONS

Official Communication issued in International Patent Application No. PCT/JP2022/004292, mailed on Apr. 19, 2022.

*Primary Examiner* — Stephen E. Jones
(74) *Attorney, Agent, or Firm* — Keating & Bennett, LLP

(57) ABSTRACT

A filter device includes a laminate body, plate electrodes, resonators, and shield conductors. The plate electrodes are provided in the laminate body and are spaced apart from each other in a lamination direction. The resonators are between the plate electrodes and extend in a first direction. The shield conductors are on respective side surfaces of the laminate body, and connected to the plate electrodes. The resonators are within the laminate body and aligned in a second direction. The resonators each include a first end connected to the shield conductor and a second end spaced apart from the shield conductor. The resonator includes conductors laminated in the lamination direction. When the resonator is viewed in plan from the first direction, the conductors each include a first region including an end portion of the conductor and having a thickness greater than other portions of the conductor.

20 Claims, 7 Drawing Sheets

(58) Field of Classification Search
CPC .. H01P 1/201; H01P 1/203; H01P 3/16; H01P 3/08; H01P 3/085; H01P 3/088; H01P 3/122; H01P 7/08; H01P 7/084
See application file for complete search history.

(56) References Cited

U.S. PATENT DOCUMENTS

| | | | | |
|---|---|---|---|---|
| 12,027,742 | B2 * | 7/2024 | Taguchi | H01P 1/20345 |
| 12,051,847 | B2 * | 7/2024 | Tada | H01P 7/04 |

FOREIGN PATENT DOCUMENTS

| | | | |
|---|---|---|---|
| JP | 2007-235465 | A | 9/2007 |
| JP | 4535995 | B2 | 9/2010 |
| JP | 2020-510326 | A | 4/2020 |

* cited by examiner

DIELECTRIC FILTER

CROSS REFERENCE TO RELATED APPLICATIONS

This application claims the benefit of priority to Japanese Patent Application No. 2021-055344 filed on Mar. 29, 2021 and is a Continuation Application of PCT Application No. PCT/JP2022/004292 filed on Feb. 3, 2022. The entire contents of each application are hereby incorporated herein by reference.

BACKGROUND OF THE INVENTION

1. Field of the Invention

The present disclosure relates to a dielectric filter, and, more particularly, to a technology to improve filter characteristics of a dielectric filter.

2. Description of the Related Art

Japanese Patent Laid-Open No. 2007-235465 discloses a band-pass filter including a multilayer dielectric resonator that includes multiple internal electrode layers stacked in a dielectric. In the band-pass filter disclosed in Japanese Patent Laid-Open No. 2007-235465, the inductive portion of the internal electrode layer is configured in a longitudinal pattern with a portion having a tapered width. This configuration allows reduction of the resonance frequency, without reducing Q value. As a result, size reduction of the resonator can be achieved.

For example, the dielectric filter, as disclosed in Japanese Patent Laid-Open No. 2007-235465, is used, in a small handheld device represented by a mobile phone or smartphone, to filter the radio-frequency signal.

Typically, the dielectric filter is manufactured by compression bonding or sintering a dielectric including multiple plate conductors disposed therein. The dielectric filter manufactured by this process may have a plate conductor that has a thinner tip, as compared to other portions of the plate conductor, due to an external pressure, or the stress caused by thermal contraction.

Typically, the radio-frequency current is known to primarily flow near the surface of a conductor, which is a signal carrying member, due to the skin effect. Therefore, a tapered tip of a plate conductor in the dielectric filter may cause an increased resistance at a radio-frequency current passage path. This increases a loss caused by the passage of the current, and Q value thereby decreases. This may result in degradation in filter characteristics of the dielectric filter.

SUMMARY OF THE INVENTION

Preferred embodiments of the present invention prevent a Q value in dielectric filters from being reduced.

A dielectric filter according to a preferred embodiment of the present invention includes a laminate body having a cuboid shape, a first plate electrode and a second plate electrode, a plurality of resonators, and a first shield conductor and a second shield conductor. The laminate body includes a plurality of dielectric layers. The first plate electrode and the second plate electrode are provided within the laminate body and spaced apart from each other in a lamination direction. The plurality of resonators are provided between the first plate electrode and the second plate electrode and extend in a first direction orthogonal or substantially orthogonal to the lamination direction. The first shield conductor and the second shield conductor are provided within the laminate body on a first side surface and a second side surface orthogonal or substantially orthogonal to the first direction and connected to the first plate electrode and the second plate electrode. The plurality of resonators are provided within the laminate body and aligned in a second direction orthogonal or substantially orthogonal to the lamination direction and the first direction. The plurality of resonators each include a first end connected to the first shield conductor and a second end spaced apart from the second shield conductor. The plurality of resonators each include a plurality of the conductors laminated in the lamination direction. When the plurality of resonators are viewed in plan from the first direction, the plurality of the conductors each include a first region including an end portion of the conductor and having a thickness greater than other portions of the conductor.

With each of the dielectric filters according to preferred embodiments of the present invention, the first region, which includes an end portion of one of the plurality of electrodes included in the dielectric resonator, has a thickness greater than other portions of the electrode. Each electrode having such a profile enables a reduced resistance of the electrode at a current passage path when a radio-frequency current flows therethrough. As a result, a Q value in the dielectric filter can be prevented from being reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
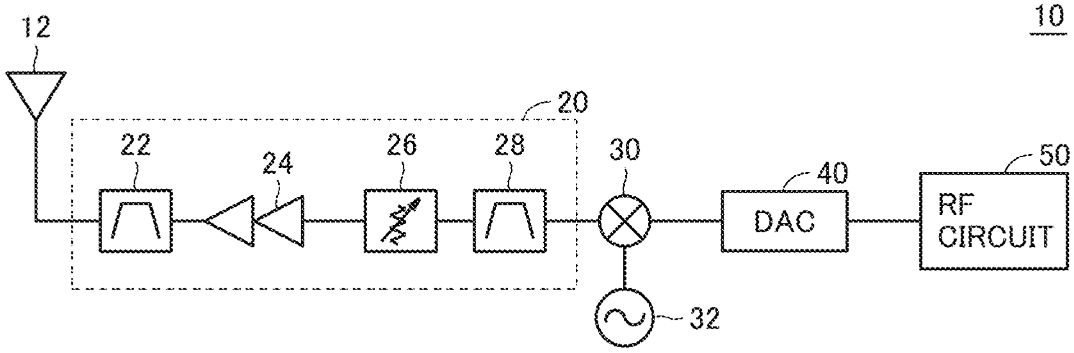
FIG. 1 is a block diagram of a communication device including a radio frequency front-end circuit including a filter device according to Preferred Embodiment 1 of the present invention.

Hereinafter, preferred embodiments of the present invention will be described, with reference to the accompanying drawings. The same reference signs are used to refer to like or corresponding portions in the drawings, and the description thereof will not be repeated.

Preferred Embodiment 1

Basic Configuration of Communication Device

FIG. 1 is a block diagram of a communication device 10 including a radio frequency front-end circuit 20 including a filter device according to Preferred Embodiment 1. The communication device 10 is, for example, a mobile terminal represented by a smartphone, or a cellular base station.

Referring to FIG. 1, the communication device 10 includes an antenna 12, a radio frequency front-end circuit 20, a mixer 30, a local oscillator 32, a digital-to-analog converter (DAC) 40, and an RF circuit 50. The radio frequency front-end circuit 20 includes band-pass filters 22 and 28, an amplifier 24, and an attenuator 26. While FIG. 1 illustrates the radio frequency front-end circuit 20 as including a transmitter circuit that transmits a radio-frequency signal through the antenna 12, the radio frequency front-end circuit 20 may include, for example, a receiver circuit that receives a radio-frequency signal via the antenna 12.

The communication device 10 upconverts a signal, carried from the RF circuit 50, into a radio-frequency signal and emits the radio-frequency signal through the antenna 12. The modulated digital signal, output from the RF circuit 50, is converted into an analog signal by the digital-to-analog converter 40. The mixer 30 mixes the analog signal, converted from the digital signal by the digital-to-analog converter 40, with an oscillating signal from the local oscillator 32, and upconverts the mixed signal into a radio-frequency signal. The band-pass filter 28 filters out undesired waves caused by the upconversion and extracts only a signal that is in a desired frequency band. The attenuator 26 adjusts the strength of the signal. The amplifier 24 power-amplifies the signal having passed through the attenuator 26, to a predetermined level. The band-pass filter 22 filters out, from the signal, undesired waves caused during the amplification process, and passes therethrough only a signal component that is in a frequency band defined by the communication standards. The signal having passed through the band-pass filter 22 is emitted as a transmission signal through the antenna 12.

Filter devices corresponding to preferred embodiments of the present invention can be used as the band-pass filters 22 and 28 included in the communication device 10 as described above.

Configuration of Filter Device

Next, referring to FIGS. 2 to 5, a specific configuration of the filter device 100 according to Preferred Embodiment 1 is described. The filter device 100 is a dielectric filter including multiple resonators that are distributed elements.

Figure 2:
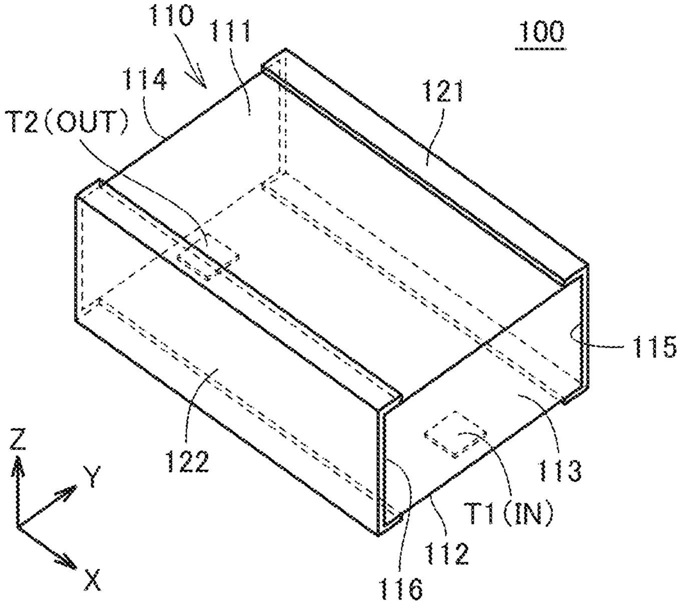
FIG. 2 is an external perspective view of the filter device according to Preferred Embodiment 1 of the present invention.
Figure 3:
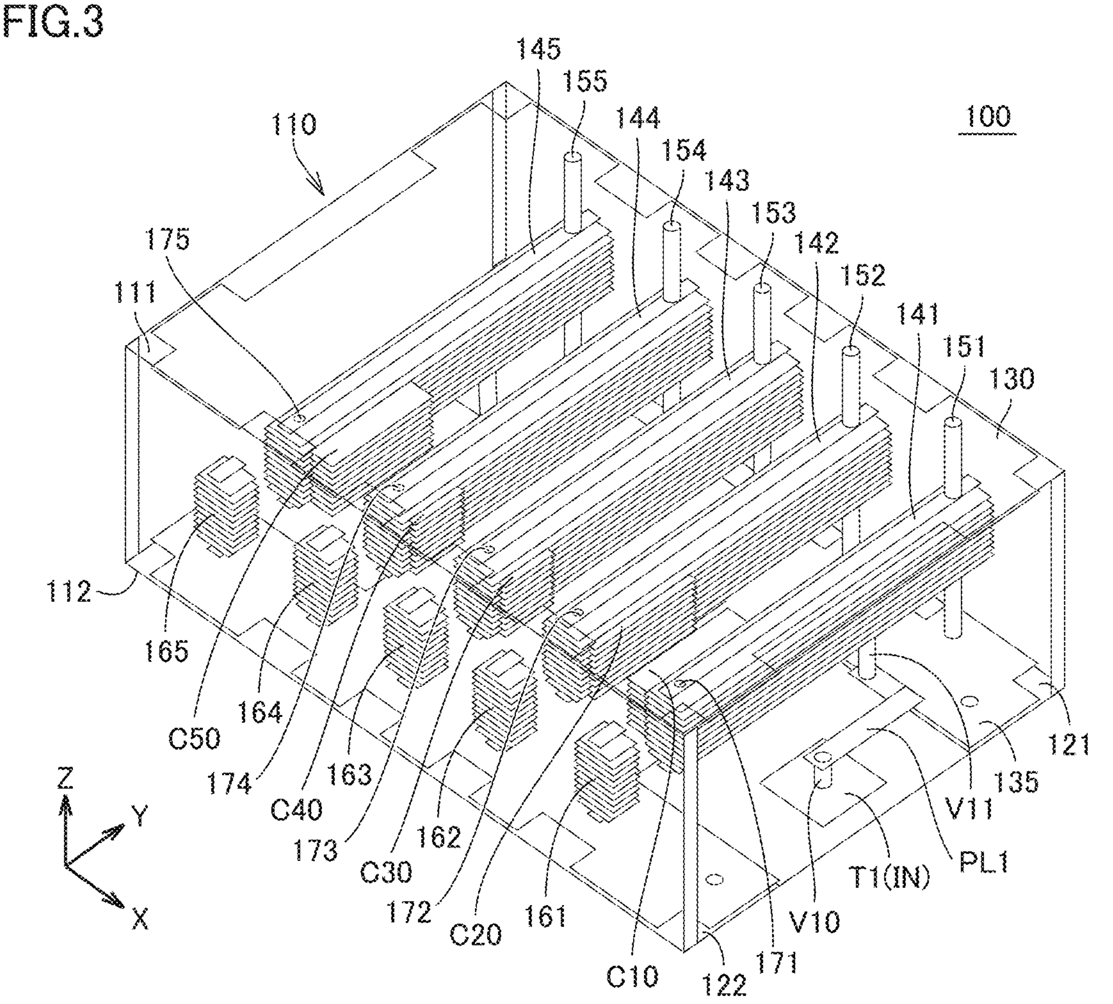
FIG. 3 is a see-through perspective view showing an internal structure of the filter device according to Preferred Embodiment 1 of the present invention.
Figure 4:
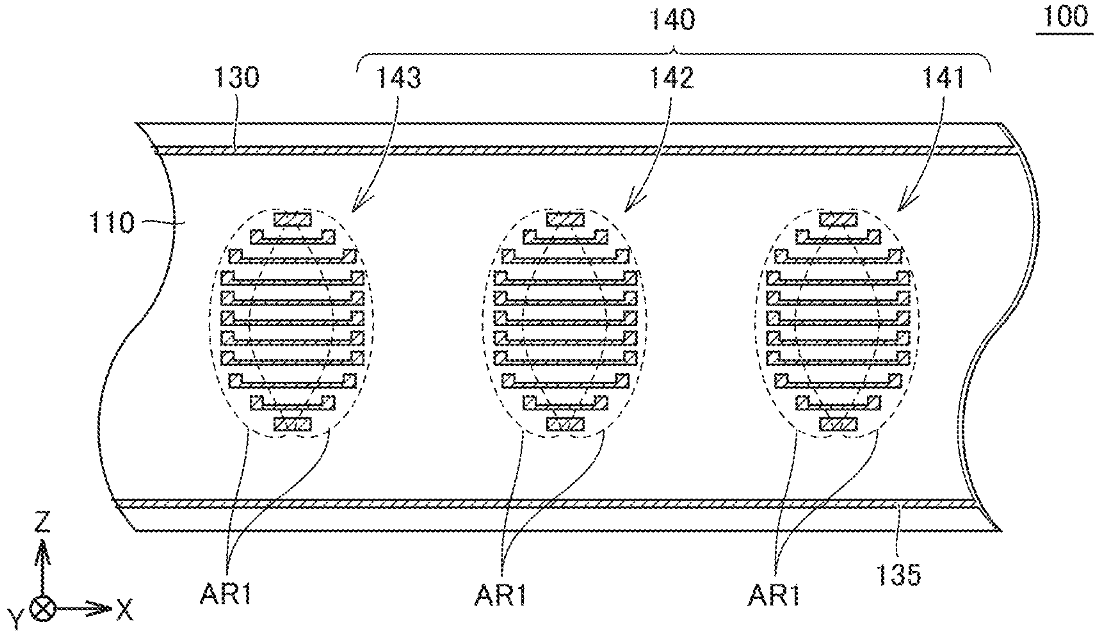
FIG. 4 is a cross-sectional view of the filter device according to Preferred Embodiment 1 of the present invention.
Figure 5:
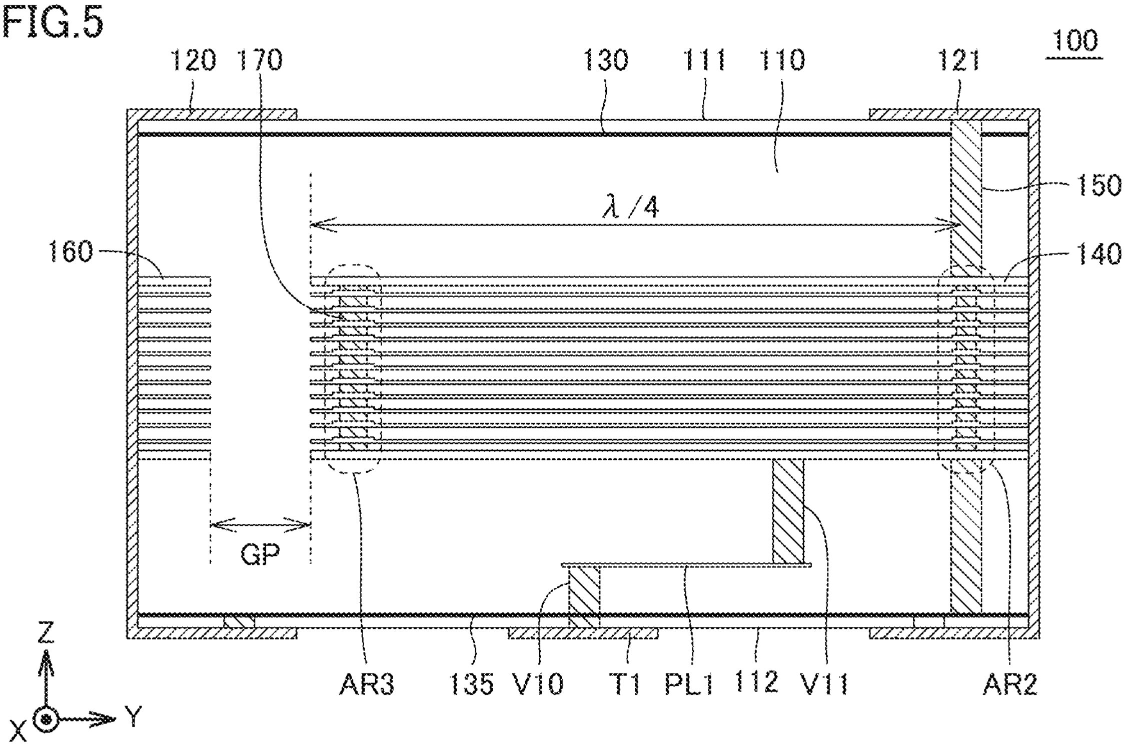
FIG. 5 is a cross-sectional view of the filter device according to Preferred Embodiment 1 of the present invention.

FIG. 2 is an external perspective view of the filter device 100. FIG. 2 only shows a configuration that can be seen from the outer surface of the filter device 100, and the internal configuration is omitted. FIG. 3 is a see-through perspective view showing an internal structure of the filter device 100. FIG. 4 is a cross-sectional view of the filter device 100. FIG. 4 is a cross-sectional view of resonators included in the filter device 100, as viewed from Y-axis direction. FIG. 5 is a cross-sectional view of the filter device 100. FIG. 5 is a cross-sectional view of the filter device 100, along Y-axis direction.

Referring to FIG. 2, the filter device 100 includes a laminate body 110 having a cuboid or substantially cuboid shape in which multiple dielectric layers are laminated in a lamination direction. The laminate body 110 includes an upper surface 111, a lower surface 112, a side surface 113, a side surface 114, a side surface 115, and a side surface 116. The side surface 113 is a side surface in the positive direction of X axis. The side surface 114 is a side surface in the negative direction of X axis. The side surfaces 115 and 116 are side surfaces perpendicular to Y-axis direction.

For example, each dielectric layer included in the laminate body 110 is made of ceramics such as a low temperature co-fired ceramics (LTCC), or a resin. Within the laminate body 110, the distributed elements including the resonators, and capacitors and inductors to couple the distributed elements include multiple plate conductors provided on each dielectric layer and multiple vias provided between the dielectric layers. The "via," as used herein, refers to a conductor that connects the conductors included in different dielectric layers and extends in the lamination direction. For example, the via is provided by a conductive paste, plating, and/or a metal pin.

In the following description, the lamination direction for the laminate body 110 will be referred to as "Z-axis direction," a direction orthogonal or substantially orthogonal to Z-axis direction and along a long side of the laminate body 110 will be referred to as "X-axis direction" (a second direction), and a direction along a short side of the laminate body 110 will be referred to as "Y-axis direction" (a first direction). Moreover, in the following, the positive direction of Z-axis in the figures may be referred to as the upper side of the figures and the negative direction of Z-axis in the figures may be referred to as the lower side of the figures.

As shown in FIG. 2, the filter device 100 includes shield conductors 121 and 122 covering the side surfaces 115 and 116 of the laminate body 110. The shield conductors 121 and 122 each have a C shape or an approximate C shape, as viewed from X-axis direction of the laminate body 110. In other words, the shield conductors 121 and 122 cover portions of the upper surface 111 and the lower surface 112 of the laminate body 110. Portions of the shield conductors 121 and 122 that are disposed on the lower surface 112 of the laminate body 110 are connected to a ground electrode on a mounting substrate (not shown) by a connection member, such as a solder bump, for example. In other words, the shield conductors 121 and 122 also define and function as ground terminals.

The filter device 100 includes an input terminal T1 and an output terminal T2, which are disposed on the lower surface 112 of the laminate body 110. The input terminal T1 is disposed on the lower surface 112, closer to the side surface 113 in the positive direction of X axis. The output terminal T2, in contrast, is disposed on the lower surface 112, closer to the side surface 114 in the negative direction of X axis. The input terminal T1 and the output terminal T2 are connected to corresponding electrodes on the mounting substrate by connection members such as solder bumps, for example.

Next, referring to FIG. 3, the internal structure of the filter device 100 is described. In addition to the configuration shown in FIG. 2, the filter device 100 further includes plate electrodes 130 and 135, resonators 141, 142, 143, 144, and 145, connection conductors 151, 152, 153, 154, 155, 171, 172, 173, 174, and 175, and capacitor electrodes 161, 162, 163, 164, and 165. In the following description, the resonators 141 to 145, the connection conductors 151 to 155 and 171 to 175, and the capacitor electrodes 161 to 165 may be comprehensively referred to as a "resonator 140," a "connection conductor 150", a "connection conductor 170," and a "capacitor electrode 160," respectively.

The plate electrodes 130 and 135 are disposed oppositely within the laminate body 110, spaced apart from each other in the lamination direction (Z-axis direction). The plate electrode 130 is disposed on the dielectric layer that is closer to the upper surface 111. Ends of the plate electrode 130 along X axis are connected to the shield conductors 121 and 122. The plate electrode 130 is shaped to cover or substantially cover the dielectric layers, as viewed in plan from the lamination direction.

The plate electrode 135 is disposed on the dielectric layer that is closer to the lower surface 112. As viewed in plan from the lamination direction, the plate electrode 135 has an H shape or an approximate H shape in which notches are provided opposite the input terminal T1 and the output terminal T2. Ends of the plate electrode 135 along X axis are connected to the shield conductors 121 and 122.

In the laminate body 110, the resonators 141 to 145 are disposed between the plate electrode 130 and the plate electrode 135. The resonators 141 to 145 extend in Y-axis direction. Each end (a first end) of each of the resonators 141 to 145 in the positive direction of Y axis is connected to the shield conductor 121. Each end (a second end) of each of the resonators 141 to 145 in the negative direction of Y axis, in contrast, is spaced apart from the shield conductor 122.

In the filter device 100, the resonators 141 to 145 are aligned in X-axis direction within the laminate body 110. More specifically, the resonators 141, 142, 143, 144, and 145 are disposed in the stated order from the positive direction of X axis to the negative direction of X axis.

The resonators 141 to 145 each include multiple conductors disposed along the lamination direction. As shown in FIG. 4, in a cross section parallel or substantially parallel to Z-X plane of each resonator 140 (i.e., a cross section as viewed in plan from Y-axis direction), the conductors, as a whole, have an oval shape or a substantially oval shape. Stated differently, among the conductors, dimensions (first widths) in X-axis direction of the uppermost and lowermost conductors are narrower than a dimension (a second width) in X-axis direction of a middle conductor. Moreover, in the filter device 100 according to Preferred Embodiment 1, each conductor includes a first region AR1 (demarcated by dashed lines in FIG. 4) that includes an end portion of the conductor along Y axis, and the first region AR1 has a thickness greater than other portions of the conductor.

Referring to FIG. 5, the resonator 140 is connected to the plate electrodes 130 and 135 via the connection conductor 150 near the first end connected to the shield conductor 121. In the filter device 100, the connection conductor 150 extends from the plate electrode 130 to the plate electrode 135, passing through the conductors included in a corresponding resonator 140. Each connection conductor 150 is electrically connected to the conductors forming a corresponding resonator.

Moreover, in the resonator 140, the conductors including each resonator are electrically connected to the connection conductor 170 near the second end on the shield conductor 122 side. The distance between the second end of each resonator and the connection conductor 150 is designed to be approximately $\lambda/4$, where $\lambda$ is the wavelength of a radio-frequency signal carried by the resonator.

As shown in FIG. 5, each conductor included in the resonator 140 includes a second region AR2 which includes a portion of the conductor connected to the connection conductor 150, and a third region AR3 which includes a portion of the conductor connected to the connection conductor 170, the second region AR2 and the third region AR3 having thicknesses greater than other portions of the conductor.

The resonator 140 defines and functions as a distributed-element TEM mode resonator, which includes multiple conductors as middle conductors and the plate electrodes 130 and 135 as outer conductors.

The resonator 141 is connected to the input terminal T1 by vias V10 and V11 and a plate electrode PL1. The resonator 145 is connected to the output terminal T2 by vias and a plate electrode, which is hidden from view by the resonator in FIG. 3. The resonators 141 to 145 are magnetically coupled. The radio-frequency signal input to the input terminal T1 is transmitted to the resonators 141 to 145 in the stated order and output from the output terminal T2, at which time, the filter device 100 defines and functions as a band-pass filter, depending on an extent of coupling of the resonators.

On the second end side of the resonator 140, a projecting capacitor electrode is disposed between adjacent resonators. The capacitor electrode is an overhung portion of the conductors including the resonator. An extent of capacitive coupling of the resonators can be adjusted by adjusting the length of the capacitor electrode in Y-axis direction, the distance of the capacitor electrode to an adjacent resonator, and/or the number of conductors comprising the capacitor electrode.

In the filter device 100, a capacitor electrode C10 projects from the resonator 141 toward the resonator 142, and a capacitor electrode C20 projects from the resonator 142 toward the resonator 141, as shown in FIG. 3. Moreover, a capacitor electrode C30 projects from the resonator 143 toward the resonator 142, and a capacitor electrode C40 projects from the resonator 144 toward the resonator 143. Furthermore, a capacitor electrode C50 projects from the resonator 145 toward the resonator 144.

The capacitor electrodes C10 to C50 are not necessary. Some or all of the capacitor electrodes may not be provided if a desired extent of coupling is achieved between the resonators. In addition of the configuration of FIG. 3, the filter device may include a capacitor electrode projecting from the resonator 142 toward the resonator 143, a capacitor electrode projecting from the resonator 143 toward the resonator 144, and a capacitor electrode projecting from the resonator 144 toward the resonator 145.

In the filter device 100, a capacitor electrode 160 is also disposed opposite the second end of the resonator 140. A cross section of the capacitor electrode 160 parallel or substantially parallel to Z-X plane is the same as or similar to the cross section of the resonator 140. The capacitor electrode 160 is connected to the shield conductor 122. This allows a capacitor to be defined by the resonator 140 and a corresponding capacitor electrode 160. The capacitance of the capacitor including the resonator 140 and the corresponding capacitor electrode 160 can be adjusted by adjusting a gap (a distance in Y-axis direction) GP between the resonator and the capacitor electrode in FIG. 5.

In the filter device 100, as a radio-frequency signal is transmitted from the input terminal T1 to the output terminal T2, the radio-frequency current flows through the conductors of each resonator with a resonance of the radio-frequency signal.

In general, the radio-frequency current is known to primarily flow near the surface of a conductor, due to the skin effect. Therefore, if a cross-sectional shape of the entirety of the conductors is a rectangular or substantially rectangular shape, current crowding is caused at the corners (i.e., the ends of the uppermost and lowermost electrodes). The current crowding can be alleviated by configuring the conductors, as a whole, to have an oval or a substantially oval cross section, as shown in FIG. 3.

In a resonator of the filter device 100, a current also flows through the conductors defining the resonator in the longitudinal direction (Y-axis direction) and a current flows between the conductors and through the plate electrodes 130 and 135 via the connection conductors 150 and 170. As described with respect to FIGS. 3 and 4, in the filter device 100, the thickness of each conductor in the first region AR1 that includes the end portion of the conductor along Y axis, the thicknesses of the conductor in the second region AR2 and the third region AR3 that include the portions of the conductor connected to the plate electrodes 130 and 135, are greater than other portions of the conductor. This configuration allows a reduced resistance of each conductor at the current path, thus reducing a loss caused by the passage of the current. As a result, a Q value of the filter device 100 can be reduced or prevented from being reduced.

As an approach to achieve the reduced resistance of each of the conductors including a resonator, it may also be contemplated to increase the thickness of the entirety of the conductor, rather than only the thicknesses of portions of the conductor in particular regions as described above. However, an increase of the conductor density in the lamination direction may cause structural defects in the manufacturing process, such as, for example, development of cracks between a conductor and a dielectric, delamination of interlayers, and/or degradation in coplanarity of the surface of the laminate body 110, due to the difference in coefficient of thermal expansion between a region dense with conductors and a region not dense with conductors. Therefore, a Q value can be reduced or prevented from being reduced and the structural deficit can be reduced or prevented from occurring, by relatively increasing the thicknesses of portions of the conductor corresponding to the current path in the conductor, and relatively reducing the thicknesses of portions of the conductors that are regions having less contribution to the current path, as the filter device 100 according to Preferred Embodiment 1.

Increasing the thicknesses of the end portions of the conductors can also improve the capacitive coupling of adjacent resonators. This, thus, contributes to size reduction of the filter device 100.

The "plate electrode 130" and the "plate electrode 135" according to Preferred Embodiment 1 correspond to a "first plate electrode" and a "second plate electrode," respectively, in the present disclosure. The "side surface 115" and the "side surface 116" according to Preferred Embodiment 1 correspond to a "first side surface" and a "second side surface," respectively, in the present disclosure. The "shield conductor 121" and the "shield conductor 122" according to Preferred Embodiment 1 correspond to a "first shield conductor" and a "second shield conductor," respectively, in the present disclosure. "Y-axis direction" and "X-axis direction" according to Preferred Embodiment 1 correspond to a "first direction" and a "second direction," respectively, in the present disclosure. The "connection conductor 150 (151 to 155)" according to Preferred Embodiment 1 corresponds to a "first connection conductor" according to the present disclosure. The "connection conductor 170 (171 to 175)" according to Preferred Embodiment 1 corresponds to a "second connection conductor" in the present disclosure.

Variation 1

Figure 6:
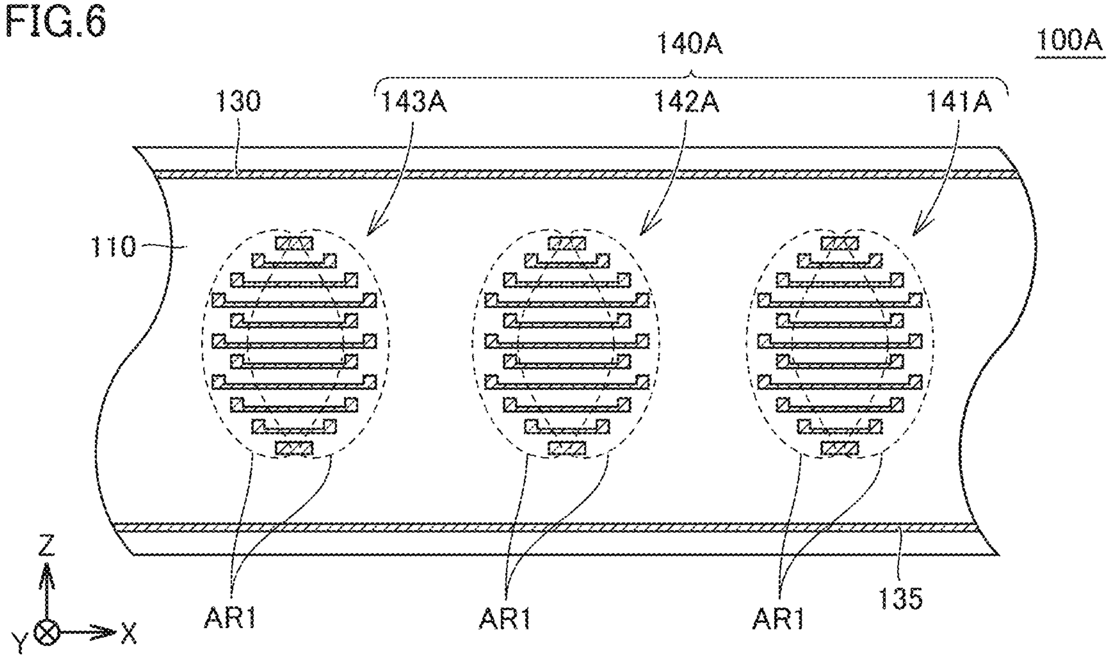
FIG. 6 is a cross-sectional view of a filter device according to Variation 1 of a preferred embodiment of the present invention.

Variation 1 of a preferred embodiment of the present invention will now be described, with respect to Variation 1 of the shapes of conductors of a resonator. FIG. 6 is a cross-sectional view of a filter device 100A according to Variation 1. FIG. 6 is a cross-sectional view of a resonator 140A included in the filter device 100A, as viewed from Y-axis direction. In FIG. 6, resonators 141A, 142A, and 143A are illustrated, of the resonators 140A.

Referring to FIG. 6, as with Preferred Embodiment 1, the resonator 140A included in the filter device 100A according to Variation 1 has an oval or a substantial oval cross section, as a whole. In each resonator included in the filter device 100A, adjacent conductors are disposed so that the first regions AR1 of the end portions of the conductors do not overlap in the lamination direction. More specifically, the conductors are disposed so that the first regions in conductors centered across the lamination direction are arranged in a zigzag manner in the lamination direction.

If the first regions, in which the conductors have increased thicknesses, overlap in the lamination direction, the conductor density of the overlapping portions is increased, as compared to other portions of the conductors. This can be a main cause of the structural defects as described above. However, in the filter device 100A according to Variation 1, the conductors are disposed so that the end portions of adjacent conductors do not overlap in the lamination direction. This can spread out the positions of the end portions of the conductors and reduce the conductor density in the lamination direction, thus reducing or preventing the structural defects from occurring.

Variation 2

Figure 7:
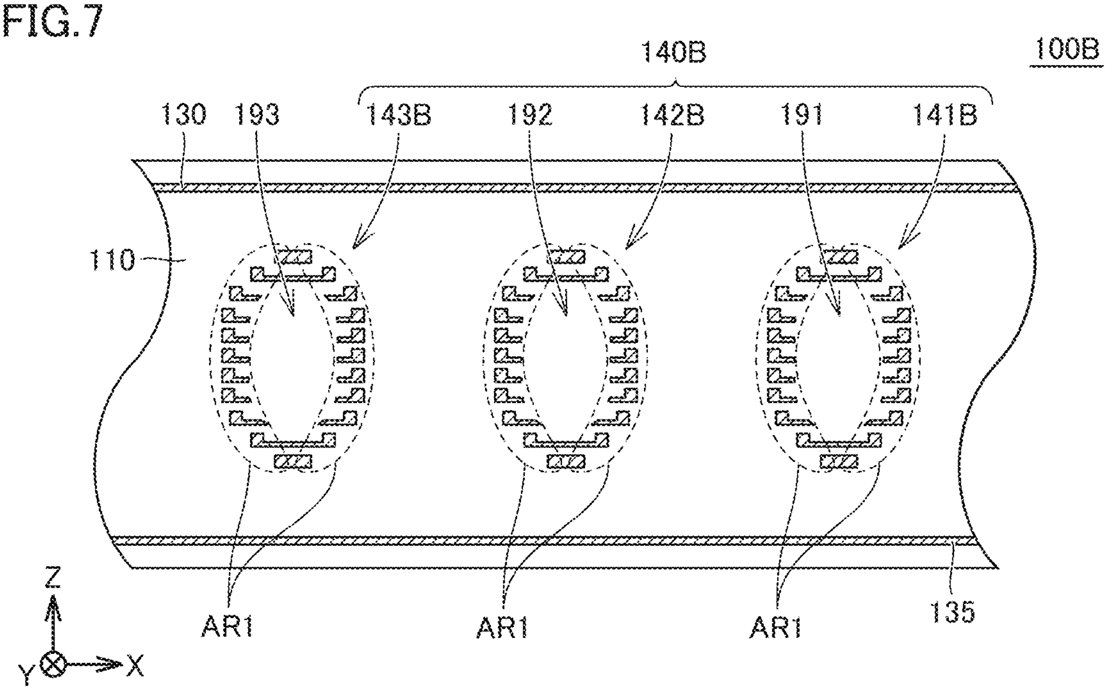
FIG. 7 is a cross-sectional view of a filter device according to Variation 2 of a preferred embodiment of the present invention.

Variation 2 of a preferred embodiment of the present invention will now be described with respect to Variation 2 of the shapes of the conductors of a resonator. FIG. 7 is a cross-sectional view of a filter device 100B according to Variation 2. FIG. 7 is a cross-sectional view of a resonator 140B included in the filter device 100B, as viewed from Y-axis direction. In FIG. 7, resonators 141B, 142B, and 143B are illustrated, of resonators 140B.

Referring to FIG. 7, as with Preferred Embodiment 1, the resonator 140B included in the filter device 100B according to Variation 2 has an oval or a substantially oval cross section, as a whole. In the filter device 100B, openings are provided in thin portions of the conductors near the center of the resonator 140B (i.e., portions other than the first regions AR1). Specifically, openings 191, 192, and 193 are provided in the resonators 141B, 142B, and 143B, respectively. The openings may be provided in portions of the conductors near the center of the resonator 140B and the conductors may include only the first region AR1 portions.

Figure 8:
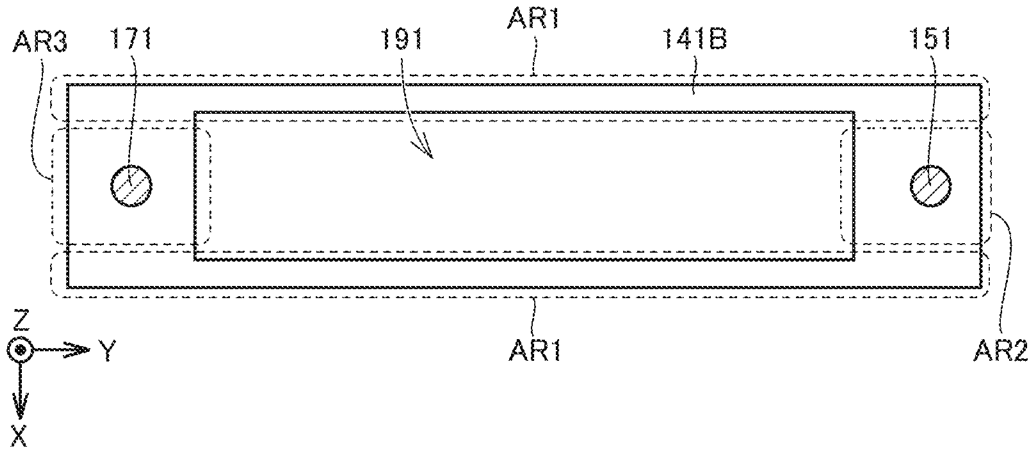
FIG. 8 is one example of a plan view of a conductor centered in the lamination direction in the filter device according to Variation 2 of a preferred embodiment of the present invention.

FIG. 8 is one example of a plan view of a conductor centered across the lamination direction in the filter device 100B according to Variation 2. As shown in FIG. 8, no openings are provided in the second region AR2 portion and the third region AR3 portion that include portions of the conductor connected to the connection conductors 150 and 170.

As described above, in the conductors including the resonator, a portion of a conductor is removed in a region that has small contribution to the current path, and the difference in conductor density of the laminate body is thus reduced. As a result, the structural deficit can further be reduced or prevented from occurring.

The configuration according to Variation 2 may be applied to the configuration of Variation 1.

Variation 3

Variation 3 of a preferred embodiment of the present invention will be now described with respect to a configuration in which a second region AR2 is further increased, where a portion of a conductor is connected to a connection conductor 150.

Figure 9:
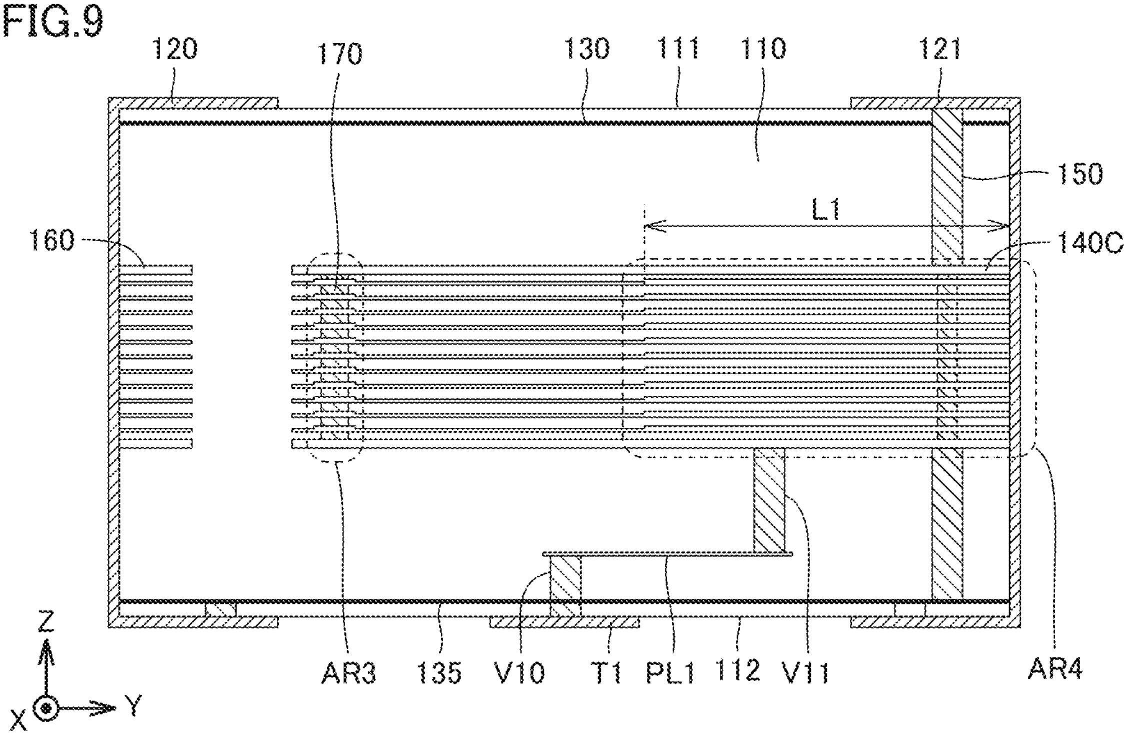
FIG. 9 is a cross-sectional view of a filter device according to Variation 3 of a preferred embodiment of the present invention.

FIG. 9 is a cross-sectional view of a filter device 100C according to Variation 3. FIG. 9 is a cross-sectional view of a resonator 140C included in the filter device 100C along Y-axis direction. In the conductors including the resonator 140C of the filter device 100C, a conductor includes a portion of a fourth region AR4 that has an increased thickness and a length L1 from a first end portion connected to a shield conductor 121 toward a second end portion direction. In the resonator 140C, each conductor also has an increased thickness in a first region AR1 that includes an end portion of the conductor in X-axis direction and a third region AR3 that includes a portion of the conductor connected to a connection conductor 170. Preferably, the length L1 is, for example, up to about half the total length of the conductor of the resonator.

In a TEM resonator, an open end (a second end) has low current density, and the current density increases toward the shorted end (a first end). Thus, insertion loss can be improved by increasing the thickness of the conductor near the first end portion.

Preferred Embodiment 2

In a dielectric filter that includes a resonator in which conductors are laminated, due to the difference in conductor density between a region where the resonator is disposed in the laminate body and a region where no resonator but only a dielectric is disposed, the structural defects may occur in the manufacturing process, such as, for example, development of cracks between a conductor and the dielectric, as described above.

Preferred Embodiment 2 of the present invention will now be described with respect to a configuration that can prevent the structural defects from occurring, while reducing or preventing degradation of the filter characteristics, by adjusting the number of conductors included in a resonator and the arrangement of the conductors.

Figure 10:
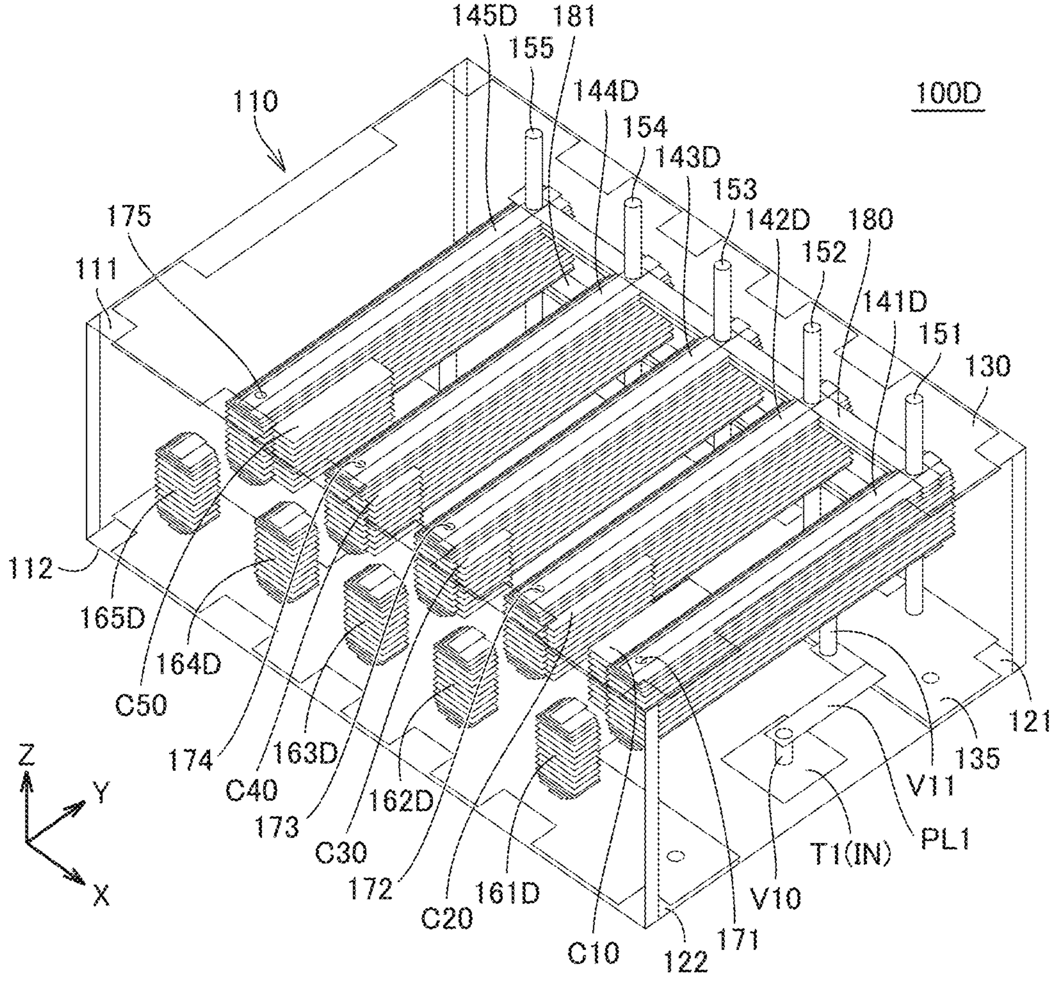
FIG. 10 is a see-through perspective view of an internal structure of a filter device according to Preferred Embodiment 2 of the present invention.

FIG. 10 is a see-through perspective view showing an internal structure of a filter device 100D according to Preferred Embodiment 2. The filter device 100D includes a resonator 140D (141D, 142D, 143D, 144D, and 145D) replacing the resonator 140 (141 to 145) included in the filter device 100 according to Preferred Embodiment 1 shown in FIG. 3, and a capacitor electrode 160D (161D, 162D, 163D, 164D, and 165D) replacing the capacitor electrode 160 (161 to 165). Moreover, in the filter device 100D, the resonators are connected to each other by connection conductors 180 and 181 near first ends of the resonators on the shield conductor 121 side. Note that the configurations of elements overlapping with those illustrated in FIG. 3 are not repeated in FIG. 10.

In the filter device 100 according to Preferred Embodiment 1, the conductors including the resonator 140 and the capacitor electrode 160 are disposed equidistantly or substantially equidistantly in the lamination direction. In contrast, in the resonator 140D and the capacitor electrode 160D in the filter device 100D according to Preferred Embodiment 2, the conductor spacing centered across the lamination direction is greater than the conductor spacing at end regions in the lamination direction.

The conductors of each resonator at the end regions on the upper surface 111 side are connected to each other by a connection conductor 180. The conductors of each resonator at the end regions on the lower surface 112 side are connected to each other by the connection conductor 181. Since the connection conductors 180 and 181 are provided, an extent of inductive coupling of the resonators can be enhanced. Note that, depending on desired characteristics, the connection conductors 180 and 181 may not be provided.

As described in Preferred Embodiment 1, the radio-frequency current has the tendency to flow to the ends of the resonator in the cross section, due to the skin effect. Therefore, considering the cross sections of the resonator and the capacitor electrode, the current is likely to be crowed and flow near the end regions near the upper surface 111 and the lower surface 112 in the lamination direction. Therefore, in Preferred Embodiment 2, the conductors defining a resonator and a capacitor electrode are arranged so that the conductor spacing at the end regions on the upper surface side and the lower surface side are narrower than the conductor spacing at the central region, and the loss caused by the passage of the current is thereby reduced.

Stated differently, in the filter device 100D, some of the conductors at the central region are thinned out, in contrast to the conductors of the resonator and the capacitor electrode all being arranged at the same or substantially the same conductor spacing as the conductor spacing at the end regions. Accordingly, as compared to the conductors being arranged at the same or substantially the same conductor spacing as the conductor spacing at the end regions, a reduced number of conductors are disposed in the central region, and the conductor density in the lamination direction is thus reduced. Accordingly, the structural defects caused by the difference in conductor density can be reduced or prevented, while reducing or preventing a Q value from being reduced by reducing or preventing the current loss.

Figure 11:
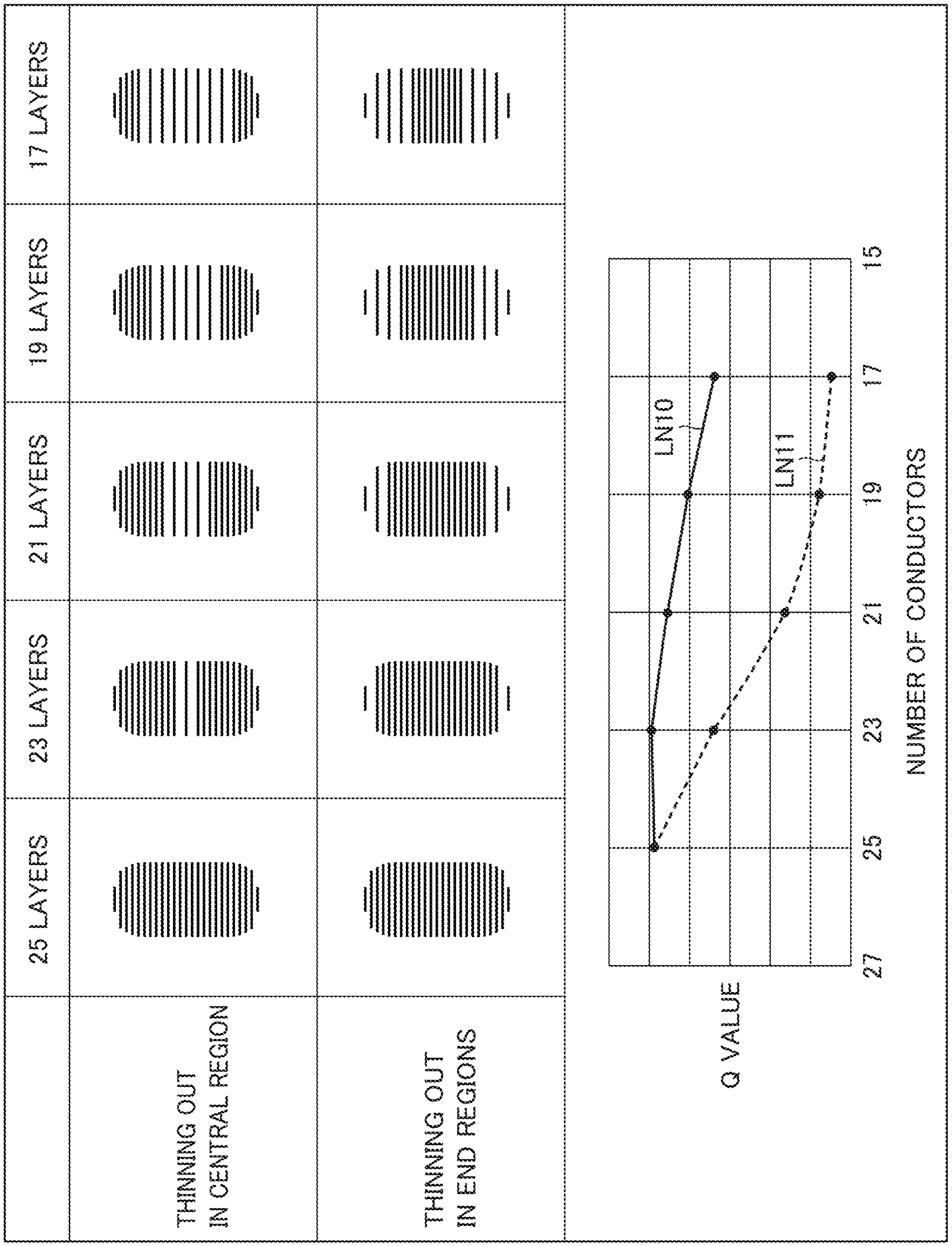
FIG. 11 is a diagram illustrating changes in a Q value when conductors are thinned out from a resonator.

FIG. 11 is a diagram illustrating changes in Q value when the conductors included in the resonator are thinned out. FIG. 11 shows the impact, to the Q value, of the positions and number of conductors of the resonator when some of the conductors are thinned out. In FIG. 11, suppose that the initial state is 25 layers of conductors being disposed equidistantly or substantially equidistantly, the graph shows the case where the conductors at the central region are thinned out as FIG. 10 (top row), the case where the conductors at the end regions are thinned out (middle row), and simulated values of Q value in these cases in the bottom row. The simulations are performed with respect to four cases, which are a case of 23 layers of conductors, a case of 21 layers of conductors, a case of 19 layers of conductors, and a case of 17 layers of conductors. In the bottom graph, the Q value when the conductors at the central region are thinned out is indicated by a solid line LN10, and the Q value when the conductors at the end regions are thinned out is indicated by a dashed line LN11.

Referring to FIG. 11, both the case where the conductors at the central region are thinned out and the case where the conductors at the end regions are thinned out show the tendency that Q value decreases with a reduction in number of conductors. However, it can be seen that the Q value when the conductors at the central region are thinned out as Preferred Embodiment 2 of FIG. 10 is greater than Q value when the conductors at the end regions are thinned out.

As described above, regarding the conductors defining the resonator and the capacitor electrode, the conductor spacing at the central region is wider than the conductor spacing at the end regions, thus reducing the total number of conductors, while inhibiting the loss. Accordingly, the structural deficit caused by the difference in conductor density can be inhibited, while inhibiting Q value from being lowered.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A dielectric filter, comprising:

a laminate body including a plurality of dielectric layers and having a cuboid or substantially cuboid shape;

a first plate electrode and a second plate electrode provided within the laminate body and spaced apart from each other in a lamination direction;

a plurality of resonators between the first plate electrode and the second plate electrode and extending in a first direction orthogonal or substantially orthogonal to the lamination direction; and a first shield conductor and a second shield conductor, provided in the laminate body on a first side surface and a second side, respectively, and connected to the first plate electrode and the second plate electrode, the first side surface and the second side surface being orthogonal or substantially orthogonal to the first direction; wherein the plurality of resonators are provided within the laminate body and aligned in a second direction orthogonal or substantially orthogonal to the lamination direction and the first direction;

the plurality of resonators each include a first end connected to the first shield conductor and a second end spaced apart from the second shield conductor;

the plurality of resonators each include a plurality of conductors laminated in the lamination direction; and when the plurality of resonators are viewed in plan view from the first direction, the plurality of conductors each include a first region including an end portion of the conductor and having a thickness greater than other portions of the conductor.

2. The dielectric filter according to claim 1, wherein first regions of some of the plurality of the conductors, as viewed in the first direction, are arranged in a zigzag manner in the lamination direction.

3. The dielectric filter according to claim 1, wherein the plurality of the conductors each include an opening in a region other than the first region.

4. The dielectric filter according to claim 1, further comprising:

a first connection conductor on a first end side of each of the plurality of resonators, and connecting the plurality of resonators to the first plate electrode and the second plate electrode; wherein the plurality of conductors each include a second region including a portion of the conductor connected to the first connection conductor and having a thickness greater than other portions of the conductor excluding the first region.

5. The dielectric filter according to claim 4, further comprising:

a second connection conductor in each of the plurality of resonators, the second connection conductor being provided on a second end side of the resonator and electrically connecting the plurality of conductors; and the plurality of conductors each include a third region including a portion of the conductor connected to the second connection conductor and having a thickness greater than other portions of the conductor excluding the first region and the second region.

6. The dielectric filter according to claim 1, further comprising:

a second connection conductor in each of the plurality of resonators, the second connection conductor being provided on a second end side of the resonator and electrically connecting the plurality of the conductors; wherein the plurality of conductors each include a third region including a portion of the conductor connected to the second connection conductor and having a thickness greater than other portions of the conductor excluding the first region.

7. The dielectric filter according to claim 6, wherein the plurality of conductors each include a fourth region including the first end and having a thickness greater than other portions of the conductor excluding the first region and the third region.

8. The dielectric filter according to claim 7, wherein the fourth region has a length in the first direction less than or equal to about half a length of the plurality of the conductors in the first direction.

9. The dielectric filter according to claim 1, wherein the plurality of conductors each include a fourth region including the first end and having a thickness greater than other portions of the conductor excluding the first region.

10. The dielectric filter according to claim 1, wherein in the plurality of conductors, conductor spacing at a central region in the lamination direction is greater than conductor spacing at end regions in the lamination direction.

11. A communication device, comprising:

a radio frequency front-end circuit including the dielectric filter according to claim 1.

12. The communication device according to claim 11, wherein first regions of some of the plurality of the conductors, as viewed in the first direction, are arranged in a zigzag manner in the lamination direction.

13. The communication device according to claim 11, wherein the plurality of the conductors each include an opening in a region other than the first region.

14. The communication device according to claim 11, further comprising:

a first connection conductor on a first end side of each of the plurality of resonators, and connecting the plurality of resonators to the first plate electrode and the second plate electrode; wherein the plurality of conductors each include a second region that includes a portion of the conductor connected to the first connection conductor, the second region having a thickness greater than other portions of the conductor excluding the first region.

15. The communication device according to claim 14, further comprising:

a second connection conductor in each of the plurality of resonators, the second connection conductor being provided on a second end side of the resonator and electrically connecting the plurality of conductors; and the plurality of conductors each include a third region including a portion of the conductor connected to the second connection conductor and having a thickness greater than other portions of the conductor excluding the first region and the second region.

16. The communication device according to claim 11, further comprising:

a second connection conductor in each of the plurality of resonators, the second connection conductor being provided on a second end side of the resonator and electrically connecting the plurality of the conductors; wherein the plurality of conductors each include a third region including a portion of the conductor connected to the second connection conductor and having a thickness greater than other portions of the conductor excluding the first region.

17. The communication device according to claim 16, wherein the plurality of conductors each include a fourth region including the first end and having a thickness greater than other portions of the conductor excluding the first region and the third region.

18. The communication device according to claim 11, wherein the plurality of conductors each include a fourth region including the first end and having a thickness greater than other portions of the conductor excluding the first region.

19. The communication device according to claim 11, wherein in the plurality of conductors, conductor spacing at a central region in the lamination direction is greater than conductor spacing at end regions in the lamination direction.

20. A dielectric filter, comprising:

a laminate body including a plurality of dielectric layers and having a cuboid or substantially cuboid shape;

a first plate electrode and a second plate electrode provided within the laminate body and spaced apart from each other in a lamination direction;

a plurality of resonators between the first plate electrode and the second plate electrode and extending in a first direction orthogonal or substantially orthogonal to the lamination direction; and a first shield conductor and a second shield conductor provided in the laminate body on a first side surface and a second side surface, respectively, and connected to the first plate electrode and the second plate electrode, the first side surface and the second side surface being orthogonal or substantially orthogonal to the first direction; wherein the plurality of resonators are provided within the laminate body and aligned in a second direction orthogonal or substantially orthogonal to the lamination direction and the first direction;

the plurality of resonators each include a first end connected to the first shield conductor and a second end spaced apart from the second shield conductor; and the plurality of resonators each include a plurality of conductors laminated in the lamination direction, and in the plurality of conductors, conductor spacing at a central region in the lamination direction is greater than conductor spacing at end regions in the lamination direction.

* * * * *